(12) United States Patent
Larsen

(10) Patent No.: US 8,166,295 B2
(45) Date of Patent: Apr. 24, 2012

(54) MESSAGE SECURITY FRAMEWORK

(75) Inventor: Jeppe Oskar Meyer Larsen, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 1691 days.

(21) Appl. No.: 11/291,032

(22) Filed: Nov. 30, 2005

(65) Prior Publication Data

US 2007/0124817 A1  May 31, 2007

(51) Int. Cl.
*H04L 29/06* (2006.01)
*G06F 11/00* (2006.01)
*G06F 12/14* (2006.01)
*G06F 12/16* (2006.01)
*G08B 23/00* (2006.01)
G06F 3/00 (2006.01)
G06F 9/44 (2006.01)
G06F 9/46 (2006.01)
G06F 13/00 (2006.01)

(52) U.S. Cl. ............ 713/167; 726/22; 719/314; 719/328
(58) Field of Classification Search ........................ None
See application file for complete search history.

(56) References Cited

U.S. PATENT DOCUMENTS

| | | | |
|---|---|---|---|
| 5,974,549 A * | 10/1999 | Golan | 726/23 |
| 6,275,938 B1 * | 8/2001 | Bond et al. | 726/23 |
| 7,251,829 B1 * | 7/2007 | Pagdin et al. | 726/22 |
| 7,328,439 B1 * | 2/2008 | Clark et al. | 719/318 |
| 7,328,457 B1 * | 2/2008 | Mister | 726/30 |
| 2002/0002677 A1 * | 1/2002 | Eade et al. | 713/164 |
| 2005/0228916 A1 * | 10/2005 | Telesco | 710/200 |
| 2007/0072661 A1 * | 3/2007 | Lototski | 463/1 |

* cited by examiner

*Primary Examiner* — Kaveh Abrishamkar
*Assistant Examiner* — Nadia Khoshnoodi
(74) *Attorney, Agent, or Firm* — Joesph R. Kelly; Westman, Champlin & Kelly, P.A.

(57) ABSTRACT

A computer-implemented method of providing security for an application running on a messaging based operating system is provided. The method includes obtaining a first message from a message queue for the application. Then, it is determined whether the first message is of a type registered by the application as being a potential security threat. Next, the first message is processed based upon the determination of whether it is of a type registered by the application as being a potential security threat. Security framework and application program embodiments are also provided.

15 Claims, 10 Drawing Sheets

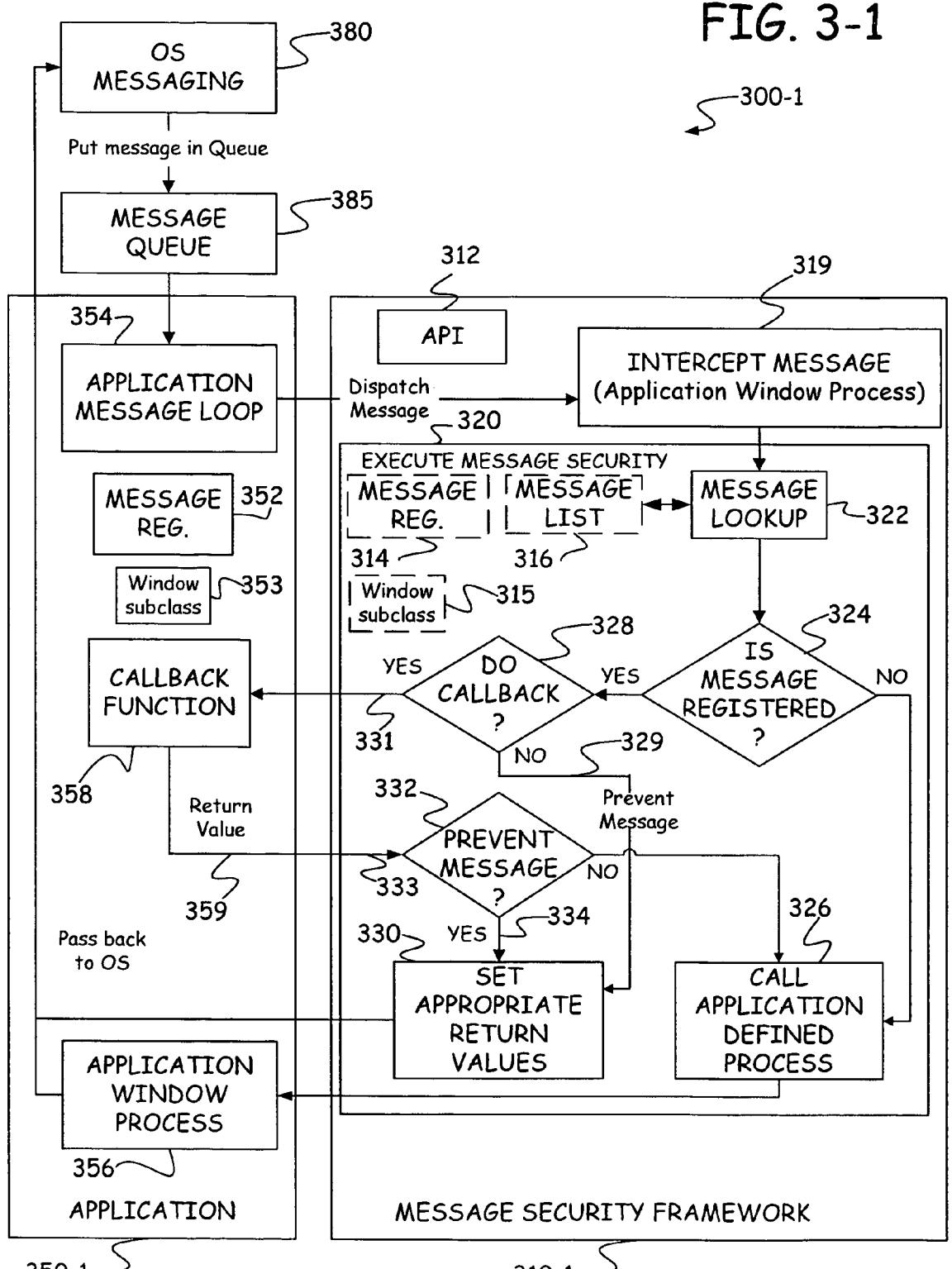

```
bool MessageSecurityFramework::DoMessageSecurity(const MSG& msg)
{
        // find the rule corresponding to this message and a security-enabled control
        MessageSecurityRule rule = m_SecurityRules.find(msg);

if(rule) // if a rule was found
        {
                // check if the rule should still to be applied - this is a callback
                if( rule.ApplyRule() )
                {
                        return rule.RunRule(); // this is a callback
                }
        }

// return false i.e. forward to application wndproc
        return false;
}
```

FIG. 9

MESSAGE SECURITY FRAMEWORK

BACKGROUND

Over time, hackers have become ever more sophisticated in the techniques which they use to attack, improperly access or otherwise maliciously tamper with application programs and data. As a result, it is a constant battle to produce secure software applications that are not vulnerable to attacks. An attack can occur in many ways, and commonly they try to take advantage of any weaknesses in the product to achieve one or more of the following:

Spoofing
Tampering
Repudiation
Information disclosure
Denial of service
Elevation of privilege One specific threat of attack involves the use of messaging between the operating system and an application program. For example, the Windows® operating systems use messaging, referred to as Win32® messaging, between application programs and the operating system to perform many tasks using application program interfaces (APIs), which are the set of routines that an application uses to request and carry out lower-level services performed by the operating system. A danger exists that malignant messages can be introduced in order to achieve one or more of the above listed effects.

The discussion above is merely provided for general background information and is not intended to be used as an aid in determining the scope of the claimed subject matter.

SUMMARY

A security framework provides message security for application programs running on a messaging based operating system. The security framework intercepts or obtains messages taken from a message queue for an application. The security framework then performs message handling security steps on the messages to prevent attacks on the application.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 3-1 is a block diagram illustrating a first message security framework embodiment.

FIG. 3-2 is a block diagram illustrating a second message security framework embodiment.

FIG. 9 is an example of a function which can be called when a message is intercepted.

DETAILED DESCRIPTION

Figure 1:
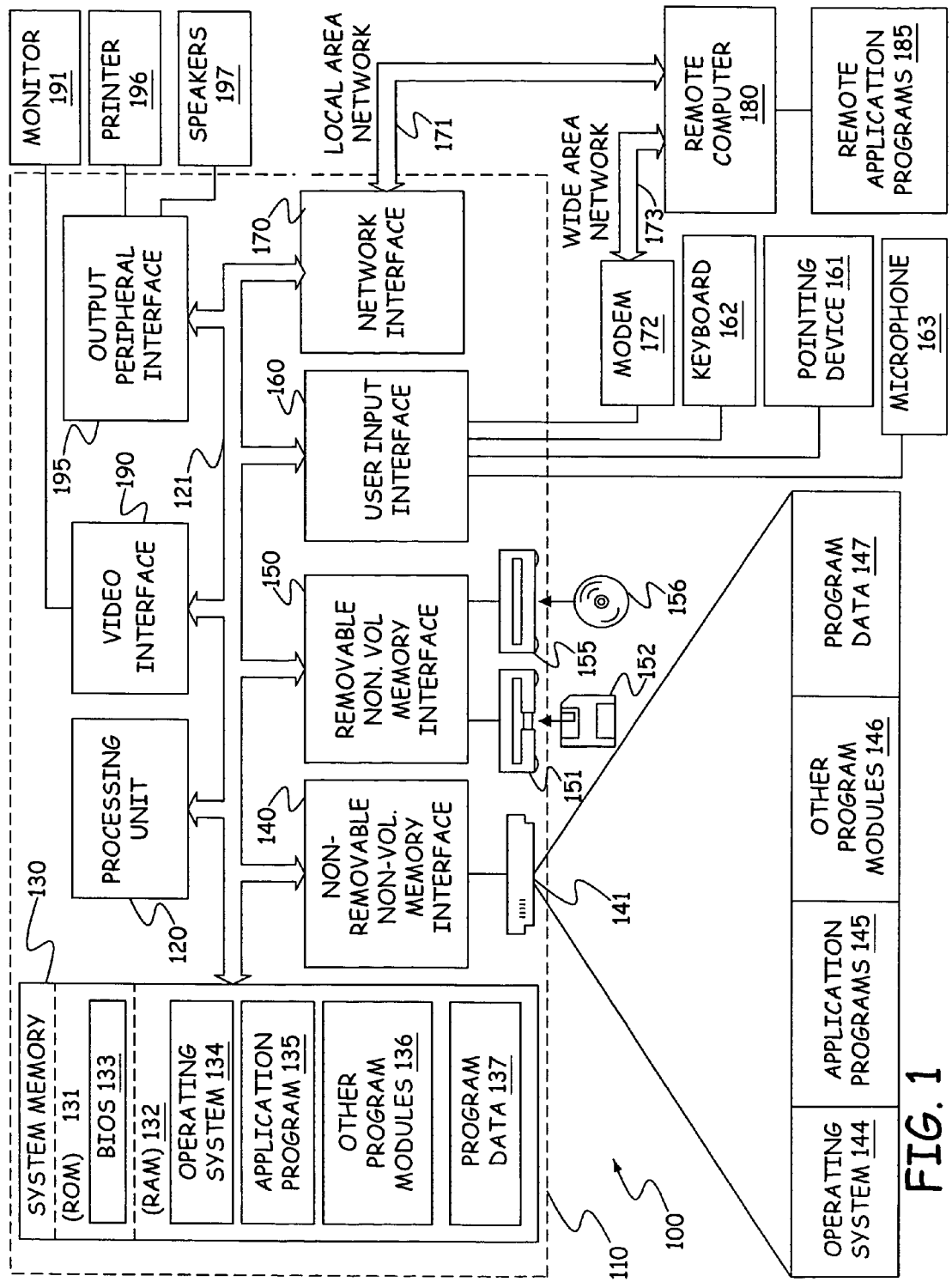
FIG. 1 is a block diagram of a one computing environment in which some embodiments may be practiced.

Some disclosed embodiments include an operating system (OS) message security framework and method which can be used to address threats of attackers sending certain types of messages to an application in order to achieve information disclosure, tampering and/or elevation of privilege. The goals of many hacking attempts, namely the previously mentioned Spoofing, Tampering, Repudiation, Information disclosure, Denial of service and/or Elevation of privilege are a classification (called STRIDE) that describes the effects of realizing a threat and what the threat allows the attacker to accomplish. STRIDE is described, for example, in *Writing Secure Code, Second Edition* (Microsoft Press, 2003) by Michael Howard and David Blanc.

The message security framework can be used and adapted to operating systems using messaging between application programs and the operating system to perform tasks using APIs. The following embodiments are provided as examples, and are not intended to limit the scope of the claims to any particular operating systems.

In some operating systems, the user interface (UI) and the interaction between a user and an application running on the operating system uses a message-based architecture. Every time the user performs an action, be it clicking a button or in anyway interacting with the application (for example via controls), messages are sent by the operating system to the application, allowing it to react accordingly. This could be some application specific behavior or the application can just let the operating system perform default actions.

However, some messages can, in certain conditions, lead to attacks that could result in the information disclosure, tampering and/or elevation of privilege if care is not exercised while responding to the message. If controls contain sensitive data that the application tries to restrict access to (e.g., by making the control read-only, hiding the control, etc.), messages that remove the restriction can be sent from another process running on the same machine as the application. The following list describes some real-world scenarios that could result in the application being compromised:

Hiding the controls—The controls that contain data to which the user does not have access rights to view are hidden, i.e., access control is performed on the UI level and not the data level. If the correct combinations of messages are sent to the control from a malicious process created by a hacker, the controls could be made visible and sensitive data might be displayed, unless the application proactively does something to prevent the messages from taking effect.

A disabled or read only control—If a control is disabled or made read-only, preventing the user from changing the data within the control, various messages sent from a malicious process could make the edit control writable and the attacker might gain access to whatever data is in the control, unless the application proactively does something to prevent the enabling of the control.

A password edit control—If the edit control contains a password (shown as dots) sending a message that changes the control properties to a standard edit control could result in the password being shown as clear text. Numerous other scenarios exist, but common for many of them is the fact that if the application does not actively perform any actions to prevent the messages from affecting the state of the controls, situations leading to information disclosure, tampering and/or elevation of privilege are possible.

The disclosed message security framework and application program embodiments can be embodied in a variety of computing environments, including personal computers, server computers, etc. Before describing the embodiments in greater detail, a discussion of an example computing environment in which the embodiments can be implemented may be useful. FIG. 1 illustrates one such computing environment which can represent any of these different types of computing environments. Other computing environments in which disclosed embodiments can be implemented are illustrated more generally in FIGS. 3-6. These computing environments are provided as examples only, and can be implemented in a computing environment such as the one described in detail with reference to FIG. 1.

FIG. 1 illustrates an example of a suitable computing system environment 100 on which one or more aspects of embodiments may be implemented. The computing system environment 100 is only one example of a suitable computing environment and is not intended to suggest any limitation as to the scope of use or functionality of the illustrated embodiments. Neither should the computing environment 100 be interpreted as having any dependency or requirement relating to any one or combination of components illustrated in the exemplary operating environment 100.

The illustrated embodiments are operational with numerous other general purpose or special purpose computing system environments or configurations. Examples of well-known computing systems, environments, and/or configurations that may be suitable for use with the illustrated embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The illustrated embodiments may be described in the general context of computer-executable instructions, such as program modules, being executed by a computer. Generally, program modules include routines, programs, objects, components, data structures, etc. that perform particular tasks or implement particular abstract data types. The illustrated embodiments may also be practiced in distributed computing environments where tasks are performed by remote processing devices that are linked through a communication network. In a distributed computing environment, program modules may be located in both local and remote computer storage media including memory storage devices. Tasks performed by the programs and modules are described below and with the aid of figures. Those skilled in the art can implement the description and figures provided herein as processor executable instructions, which can be written on any form of a computer readable medium.

With reference to FIG. 1, an exemplary system includes a general-purpose computing device in the form of a computer 110. Components of computer 110 may include, but are not limited to, a processing unit 120, a system memory 130, and a system bus 121 that couples various system components including the system memory to the processing unit. System bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, Intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

There are many ad-hoc ways to prevent messages, sent to an application with malignant intent, from causing harm. However, not having a systematic approach to this problem could lead to vulnerabilities in products (e.g., application programs) and to unnecessary work when trying to secure each product in different ways. Disclosed embodiments provide a framework and method to handle possibly malignant messages in a generic, non-intrusive and systematic way that makes it possible to apply the framework in most or every application run on a messaging based operating system. This potentially makes the product more secure and resilient to message based hacker attacks.

In various disclosed embodiments, the message security implementation can be placed in a reusable component that is used by the application applying the message security framework. The application uses the framework by calling the API exposed by the framework, where the main task is to register the controls that need to be secured together with the messages that are considered harmful. If a malignant message is received by the framework the application has the option to supply a callback function that is used by the framework to call back into the application giving it a chance to control what actions should be taken in response to the message.

Figure 2:
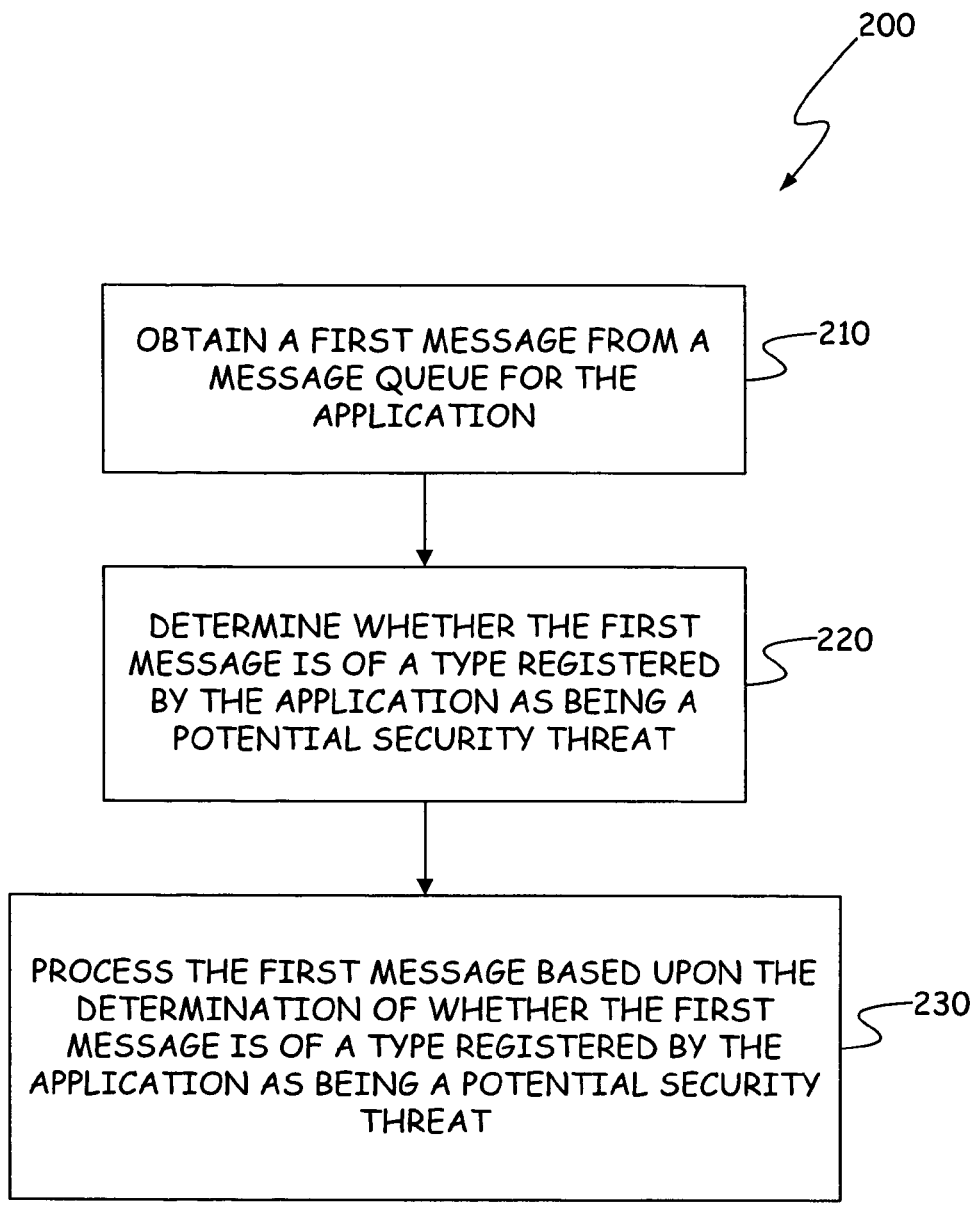
FIG. 2 is a flow diagram illustrating a method embodiment.
Figure 4:
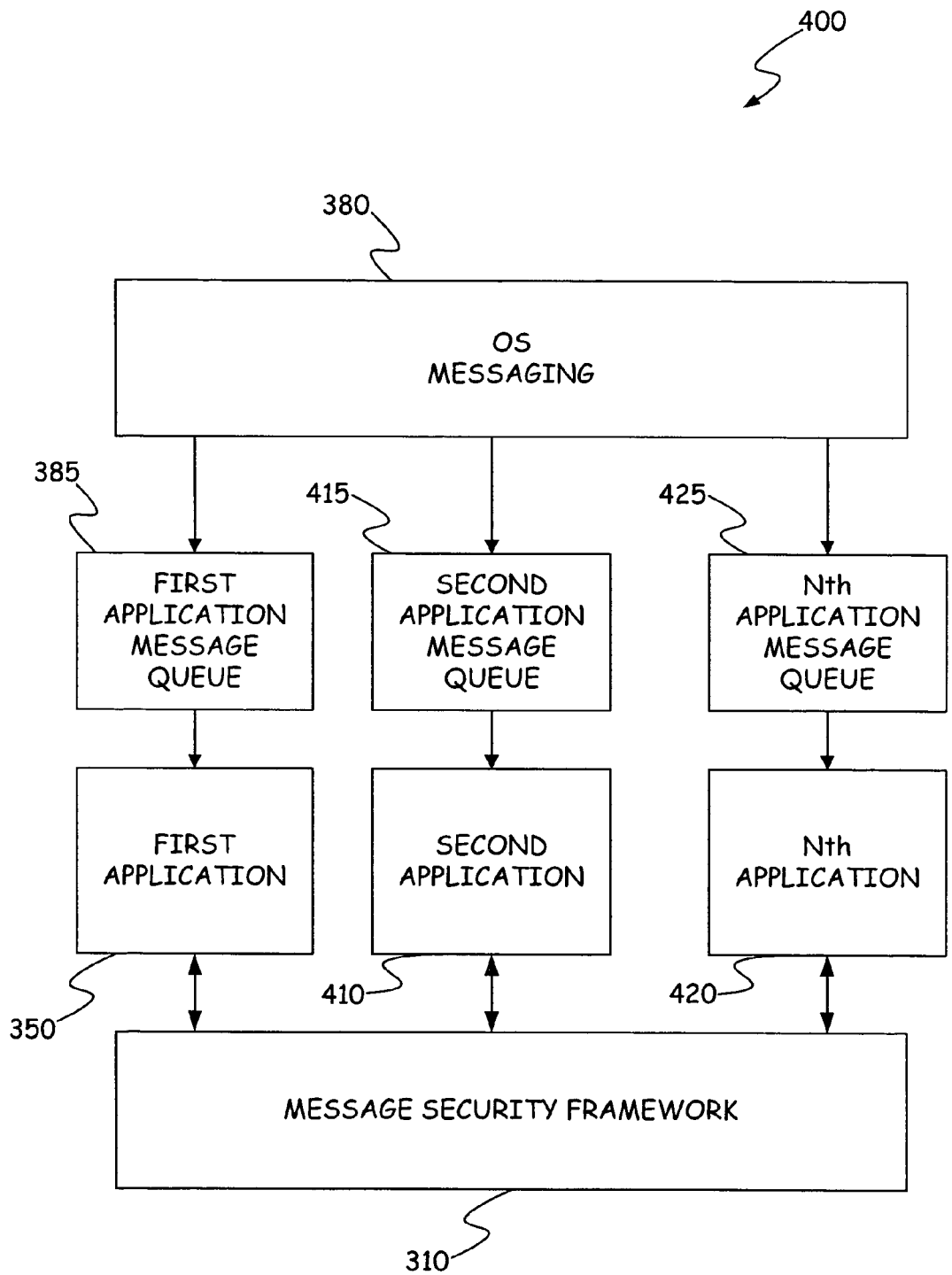
FIG. 4 is a block diagram illustrating message security framework in use by multiple applications.
Figure 5:
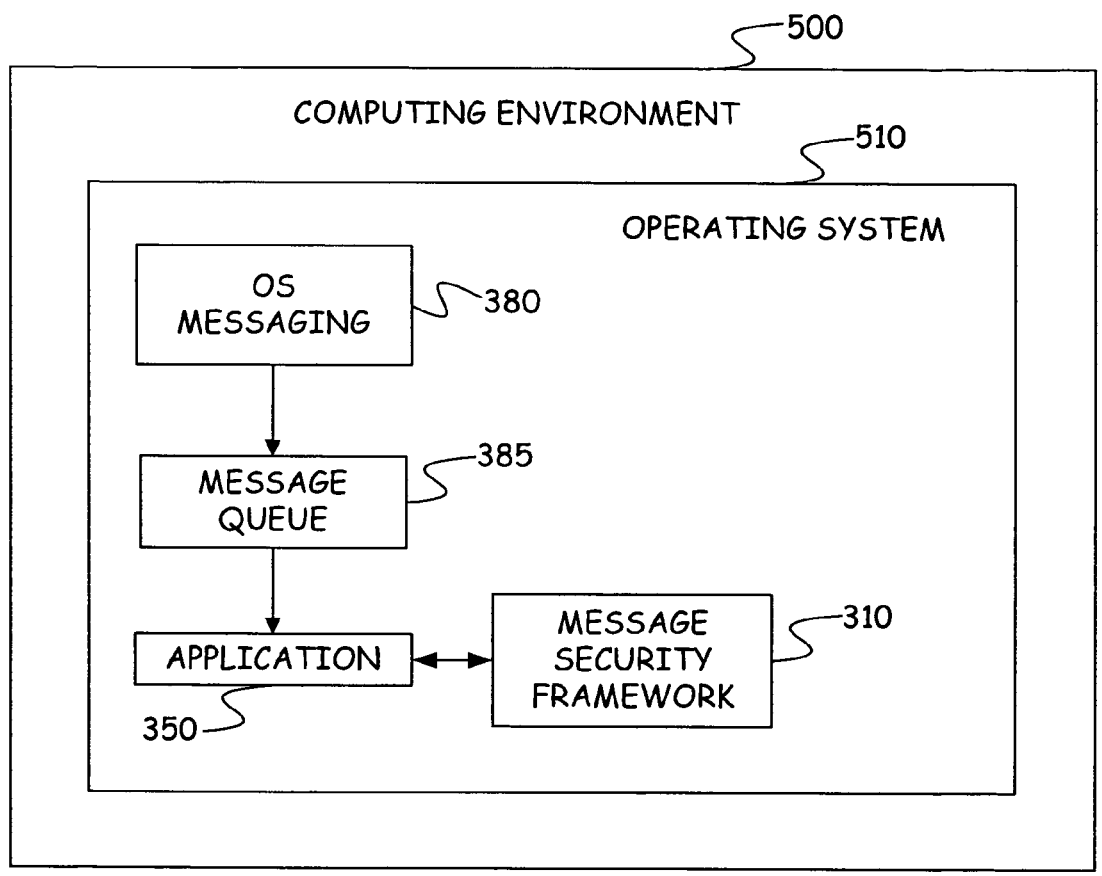
FIG. 5 is a block diagram of a computing environment in which both an application program and a message security framework embodiment can be practiced.
Figure 6:
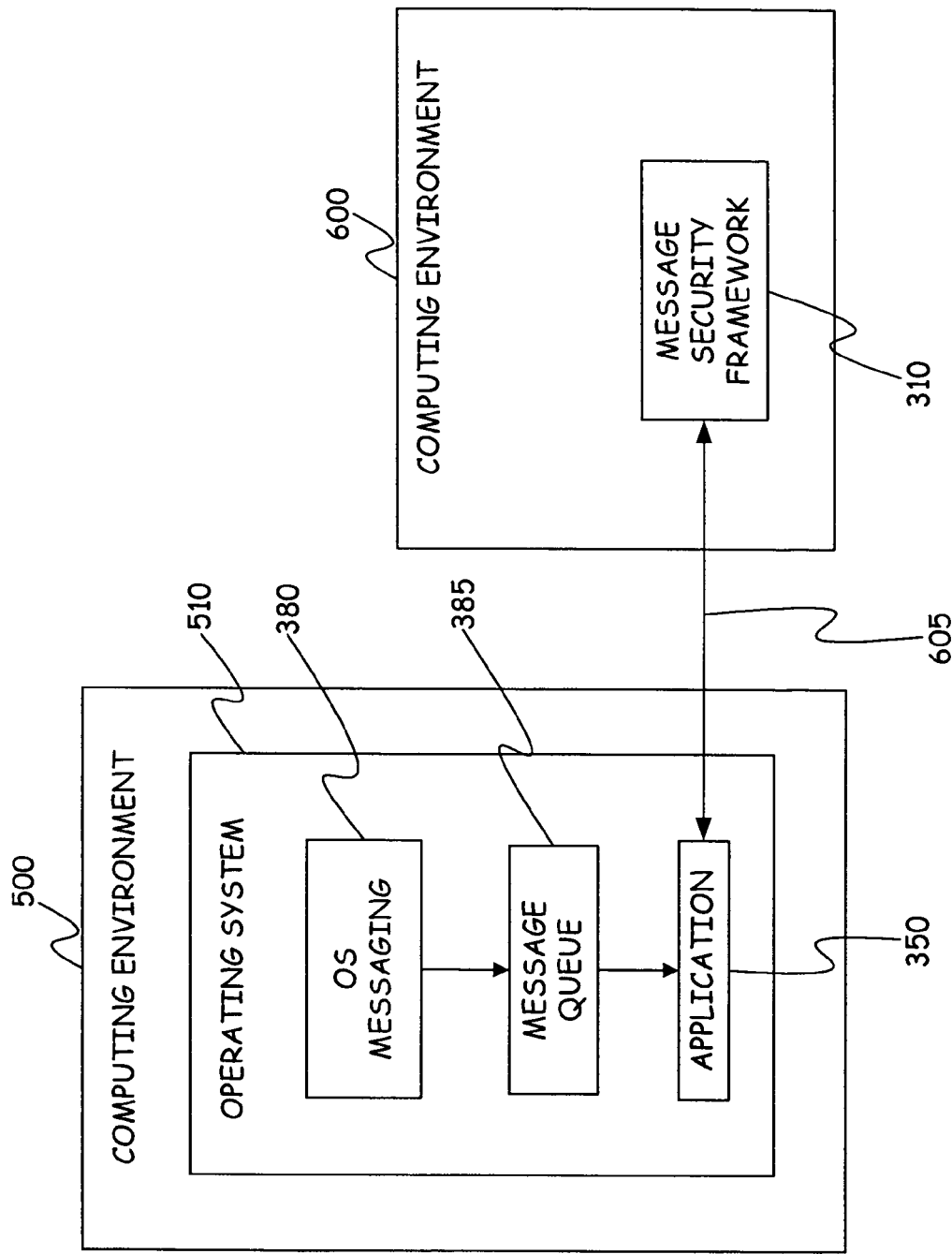
FIG. 6 is a block diagram illustrating an application program and a message security framework embodiment practiced in separate computing environments which are networked together.

Referring now to FIG. 2, shown is a flow diagram 200 illustrating an embodiment of a method of providing security for an application (e.g., application 350 shown in FIGS. 3-1 and 3-2) running on a messaging based operating system (e.g., operating system 510 shown in FIGS. 5 and 6). As will be described below with reference to FIGS. 3-6, the method can be implemented using a message security framework (e.g., framework 310), the details of which will be provided in accordance with example embodiments.

The method embodiment illustrated in FIG. 2 includes the step 210 of obtaining a first message from a message queue for the application. Then, as illustrated, the method embodiment includes the step 220 of determining whether the first message is of a type registered by the application as being a potential security threat. As shown at step 230, the method next includes processing the first message based upon the determination of whether the first message is of a type registered by the application as being a potential security threat.

Figures 2, 3:
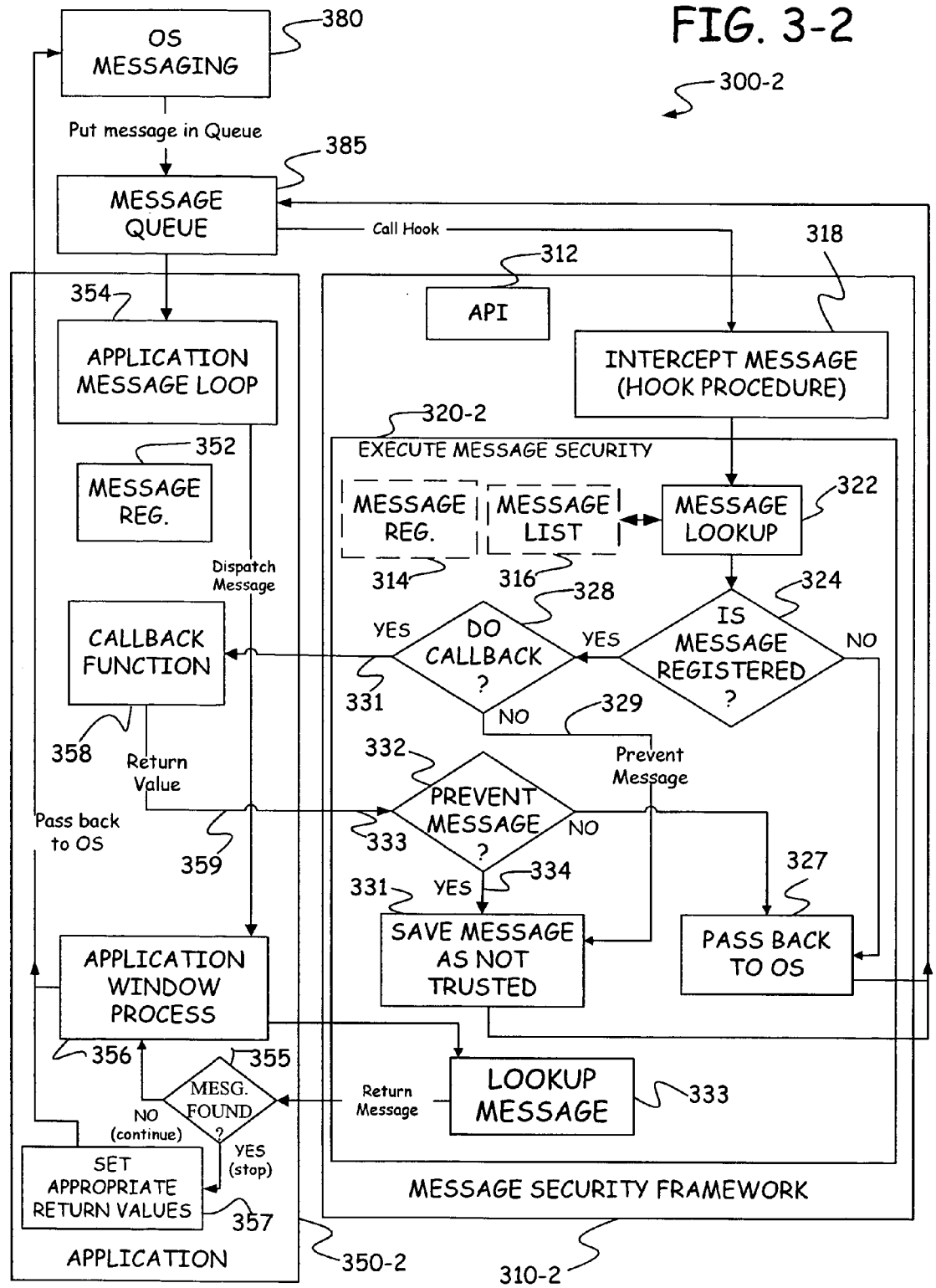

To more clearly describe more particular example embodiments of these method steps, an introduction of the alternate computing environments 300-1 and 300-2 shown in FIGS. 3-1 and 3-2 is now provided. FIGS. 3-1 and 3-2 represent alternate embodiments. In FIGS. 3-1 and 3-2, common or similar components are numbered the same. In FIG. 3-1, an application program is designated 350-1, while in FIG. 3-2 the application program is designated 350-2, to represent that certain differences can be implemented between these two embodiments to perform functions in different manners. Likewise, in these two FIGS., different embodiments of a message security framework are designated as 310-1 and 310-2. References herein to an application program 350 are intended to refer to either application program embodiment, while references to message security framework 310 are intended to refer to either message security framework embodiments.

In FIG. 3-1, a computing environment is illustrated in which an application program 350-1 runs on a messaging based operating system which provides operating system messaging functions 380. The operating system messaging functions place messages for application 350-1, of the type described above, in a message queue 385 which is managed by the operating system for the application. As in a conventional application, application 350-1 includes an application message loop component 354 which retrieves messages from message queue 385. Application 350-1 also includes one or more application window processes 356 configured to handle or act in response to the retrieved messages.

Application 350-1 differs from conventional applications in that instead of passing messages retrieved from message queue 385 to an application window process 356, the dispatched messages are intercepted by (or dispatched to) an application window process 319 of message security framework 310-1. In various embodiments, message security framework 310-1 can run on the same operating system as does application 350-1. For example, see FIG. 5 which illustrates both of application 350 and message security framework 310 running on operating system 510 on a computer 500. In other embodiments, message security framework 310 at least partially resides on a second computing environment or computer connected to the first computer over a computer network. See for example FIG. 6 which illustrates message security framework 310 residing on a separate computer 600, connected to computer 500 on which application 500 resides, via a network 605. In method 200 illustrated in FIG. 2, alternate embodiments of step 210, of obtaining the first message from the message queue 385, include obtaining the first message using the message security framework 310 in these various environments.

Figure 7:
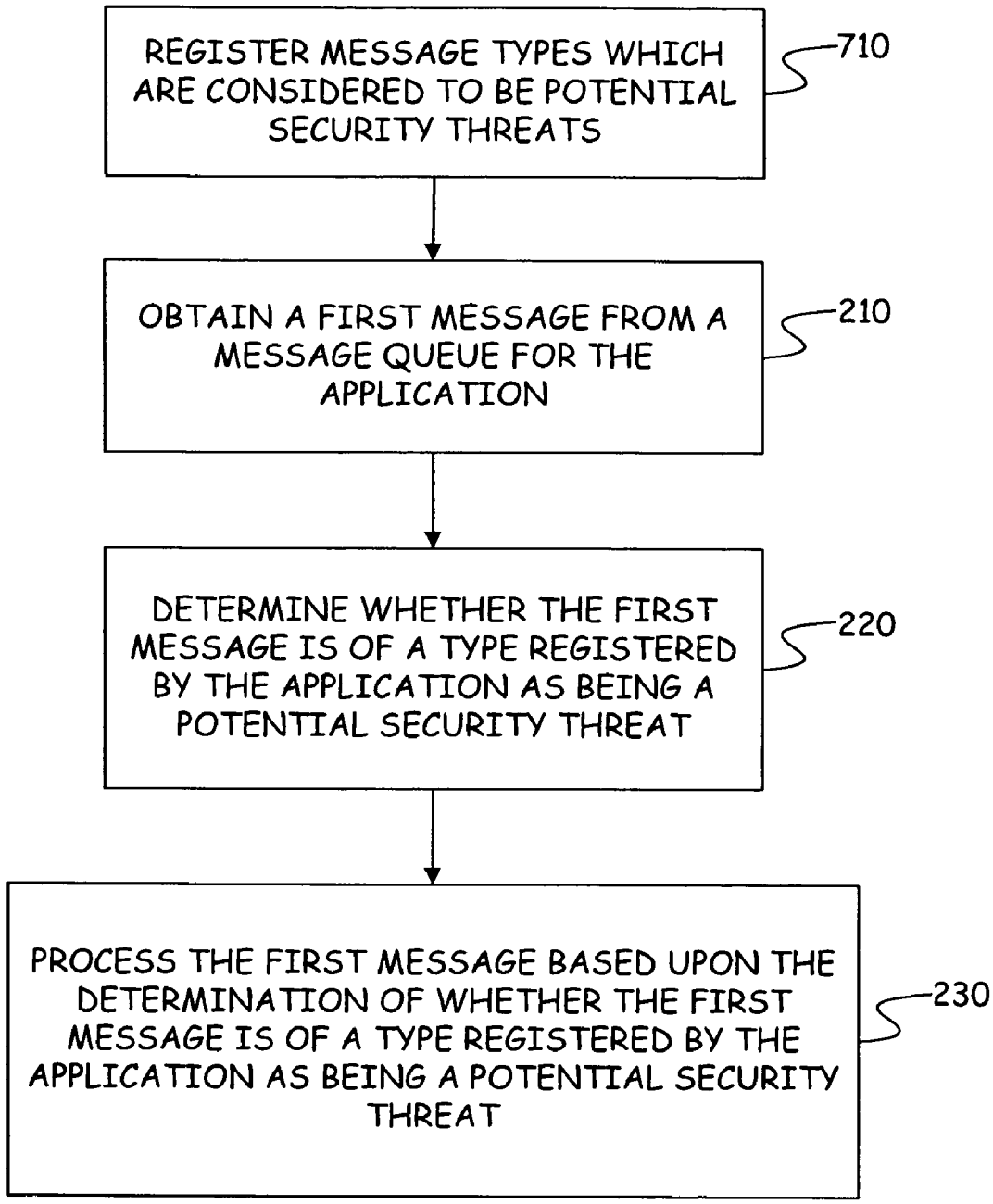
FIG. 7 is a flow diagram illustrating another method embodiment.

In the embodiment shown in FIG. 3-1, the security framework 310-1 includes message intercepting component 319 in the form of an application window process which obtains messages taken from message queue 385 (via dispatch from application message loop 354), and a message security component 320-1. Message security component 320-1 is configured to receive the messages from the application window process 319 and to perform message handling security steps on the messages to prevent attacks on application 350-1. Message security framework 310-1 has an application program interface (API) 312 which can be called by application 350-1 and any other applications for which message security framework 310-1 is providing message handling security. After calling API 312, application 350-1 uses a message registration component 352 to interface with a message registration component 314 of framework 310-1 in order to register messages which are potential security threats. In the embodiment illustrated in FIG. 3-1, these registered messages are stored in a message table or list 316. As will be described below in greater detail, the table or list 316 can be in the form of an associative container. In some embodiments of the disclosed methods, the methods include a step of registering the message types which are considered to be potential security threats. This is illustrated for example in FIG. 7 with the inclusion of step 710 prior to step 210.

Referring back to FIG. 3-1, to intercept a message, application 350-1 calls a method (application window process 319) for every window (including controls) that it creates which will perform what is commonly referred to as "subclassing" (window subclasses 353 and 315 are shown in FIG. 3-1). This ensures that after application message loop 354 gets a message from the queue 385 and dispatches it, the application window process 319 is called instead of application window process 356 of application 350-1. For every window created in application 350-1, a call is made to message security framework 310-1 to subclass the window being created. An alternate message intercepting technique can also be used, as shown in FIG. 3-2, in which a hook procedure 318 is employed. That alternate embodiment is described later in greater detail.

Referring again to FIG. 3-1, after intercepting a message using message intercepting component 319, message security component 320-1 implements a series of message handling security steps to prevent attacks on application 350-1. Two of these steps are illustrated in FIG. 3-1 as message lookup component or function 322 and message registration determination function 324. These steps or functions correspond to a more particular embodiment of step 220 shown in FIG. 2. Message lookup function 322 checks to see if the message is one of the messages in associative container or message list 316 to determine if there is a type match. Message registration determination function 324 then routes the internal process accordingly.

If it is determined that a particular message is not of a type registered by application 350-1 as being a potential security threat, then message security component 320-1 is configured to call a window process 356 of application 350 for handling the message in a conventional manner. This is illustrated in FIG. 3-1 at step or function 326. Referring briefly back to the method shown in FIG. 2, in some example embodiments, the step 230 of processing a message includes step 326 of calling application window process 356 for handling a message if it was determined that the message is not of a type registered by the application as being a potential security threat.

In accordance with some embodiments, other more particular sub-steps of processing step 230 from FIG. 2 are also illustrated in FIG. 3-1 and are implemented by message security component 320. For example, if the particular message is of the type registered by application 350 as being a potential security threat, message security component 320-1 can also be configured to determine whether to perform a callback to a callback function 358 of the application 350-1. This determination is represented in FIG. 3-1 at step or function 328, with the performance of a callback represented at 331. If it is determined to not perform the callback, then the message security component 320-1 prevents the message (as represented at 329) and causes a next message in the message queue 385 to be obtained by setting appropriate return values as represented at 330.

The determination whether to perform a callback for a particular registered message type can be based on the preferences of application 350-1 for the particular message type. This information can be provided by application 350-1 at the time of message registration. If a callback is desired, message security component 320-1 is configured to wait for the return value 359 provided by callback function 358 of application 350. The return value can be, for example, a value indicating yes or no instructions as to whether to prevent the message. Receipt of the return value is represented at 333 in FIG. 3-1, and step or function 332 represents the determination of whether to prevent the message based on the return value. The step of preventing the message is represented at 334. When the message is prevented, return values are set (as represented at step 330) to cause the next message in the message queue to be obtained. If it is determined not to prevent the message based on the return value 359, then message security component 320-1 is configured to call the application window process 356 for handling the message. This step or function is illustrated at 326 in FIG. 3-1.

Referring again to FIG. 3-2, shown is an alternate embodiment of application program 350 and message security framework 310. Again, in this embodiment, instead of dispatching the message to message security framework 310-2, a call hook procedure 318 is used to intercept the message from message queue 385 while application message loop 354 is retrieving is getting the message, but before the message returns. In this embodiment, changes are needed in the way message security framework 310-2 prevents the message. In this embodiment, the message is flagged (e.g. by storing it in the message security framework 310-2 as not trusted as shown at step 331) if it is to be prevented. Then, control is passed back to the application window process 356 (via passing it back to the operating system) every time as represented at step 327. Application window process 356 then calls back into message security framework 310-2 and ask if this message is flagged or not. This is shown in FIG. 3-2 at lookup message step or function 333. Lookup step or function 333 returns the message, or an indication that the message was found, if the message saved as not trusted in step 331. At step or function 355, application 350-1 determines whether the message was found. If it is flagged (message found as represented by a yes response at decision step 355), then the application window process 356 immediately sets the appropriate return values as shown at 357, and returns the message to the operating system messaging functions 380. If it is not flagged (a now answer at decision step 355), application window process continues as normal with processing the message.

A reason for this change is that if a hook procedure is used to intercept the message, the operating system always sends the message to application window process 356, regardless of what the hook procedure returns in step or function 330. With the modifications between message security framework embodiments illustrated in FIGS. 3-1 and 3-2, in FIG. 3-2 it is not until this point that message queue 385 returns control to application message loop 354, which will dispatch the message directly to application window process 356. From application window process 356, the described call back into message security framework 310 is now made to determine if the message is flagged or not.

Likewise, if the message is deemed as trusted in step or function 332 (a no response) and it is not prevented instead of an arrow from 332 to 326, control is returned back to message queue 385. It is not until this point that message queue 385 returns control to application message loop 354, which will dispatch the message directly to application window process 356.

As noted above, in some embodiments, application program 350 contains several features which depart from conventional message handling features. For example, in the embodiment shown in FIG. 3-1, application message loop 354 is configured to dispatch messages to message security framework 310-1 instead of to application window process 356. Further, in both illustrated embodiments, application program 350 includes callback function 358 configured to receive a callback from the message security framework 310 when a message dispatched to the message security framework has been registered as being a potential security threat to the application program 350. As discussed, callback function 358 is also configured to provide a return value to the message security framework 310 instructing the message security framework whether to prevent the message. Further still, some embodiments of application 350 include registration component 352 configured to register message types which are considered to be potential security threats.

Referring now to FIG. 4, provided is a block diagram illustrating a computing environment 400 in which operating system messaging 380 functions to manage multiple application message queues (queues 385, 415 and 425 are illustrated) for multiple application programs (applications 350, 410 and 420 are shown). As can be seen in FIG. 4, message security framework 310 is coupled to each of the application programs and provides message security for each. Thus, this figure serves to illustrate that message security framework 310 can be used to implement a system approach to message handing security, instead of being an approach designed for a single application in an ad hoc fashion.

The disclosed message security framework has, in some embodiments, three main characteristics, namely it is generic, non-intrusive and systematic. The framework is generic in that it can be utilized by message based applications running on a message based operating system. The framework can utilize common APIs to intercept messages that are bound to the controls in the application, and then the framework can apply any security restrictions registered by the application. The framework is non-intrusive in that the only requirement for the application to take advantage of the security framework is that it registers the controls and messages that it is interested in protecting. It does not require any changes to the rest of the message handling implementation in the application. In addition, the framework will not add any significant overhead to the message processing work in the application. The framework is systematic in that it provides a systematic approach to solving the problem of message based attacks. The application developer does not need to worry about the details of how and when the message is processed. Instead, the developer can focus on how to react to certain messages if the control is in a vulnerable state (e.g. is disabled). In other words the focus is taken away from dealing with the plumbing and is instead centered on how to secure the application. The framework exposes a simple interface for implementing the callback functionality in the application effectively defining a schema for implementing message security in the application.

A task of the framework is to manage the registered controls and messages. A suitable data structure that allows for fast lookup in order to locate the required callback function for a specific message (if one has been registered) aids in making the framework non-intrusive. To accomplish this task a standard associative container can be used to implement message list or table 316 shown in FIGS. 3-1 and 3-2, but care should be taken when defining the key used for fetching data in the container. The Message class 805 in the UML diagram shown in FIG. 8 implements such a key.

Figure 8:
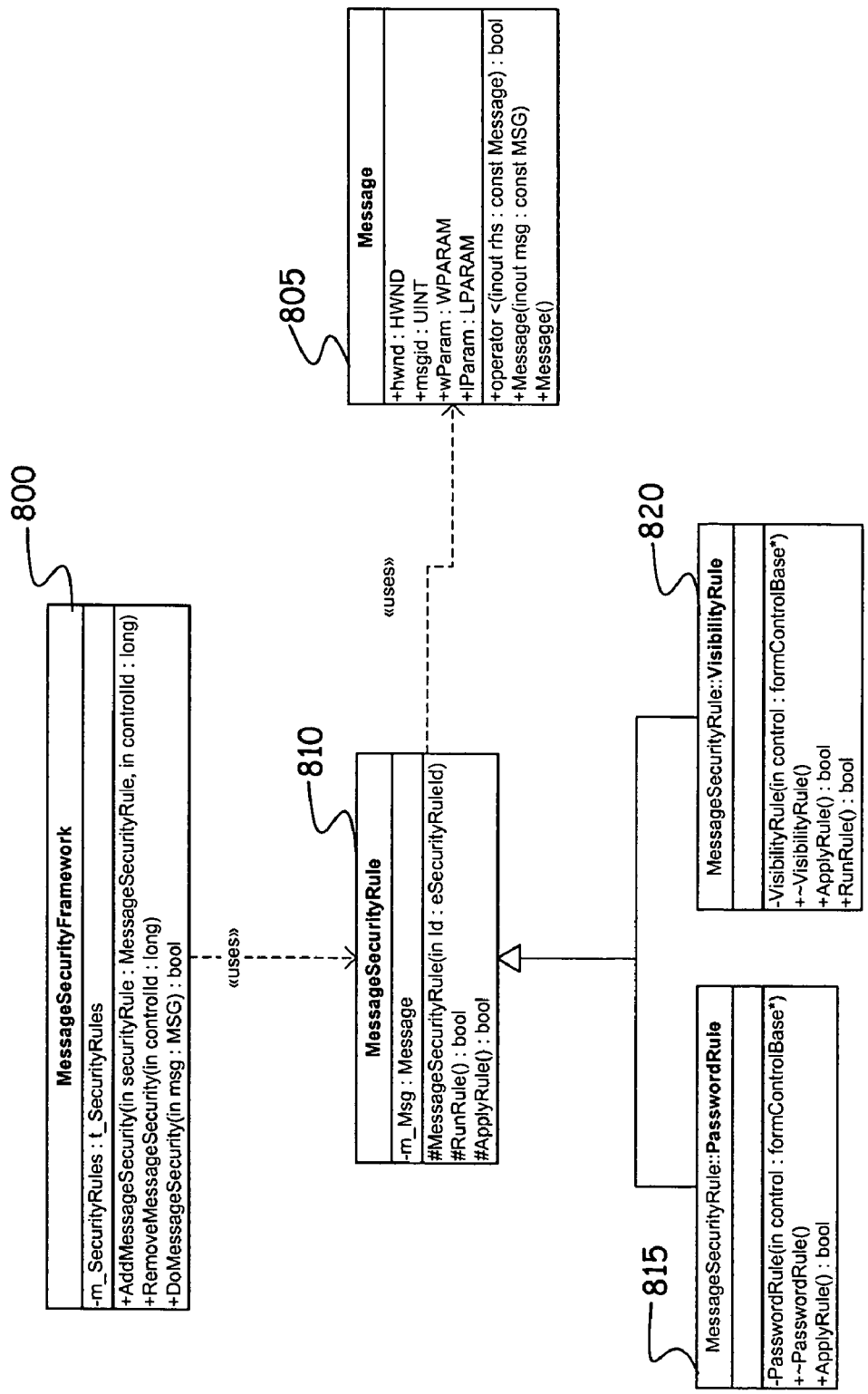
FIG. 8 is a Unified Modeling Language (UML) diagram illustrating one example embodiment of a message security framework.

Referring to FIG. 8, the interface for creating callback functionality is exposed to the application via the MessageSecurityRule class 810. This base class is used to define a schema for creating specific rules in the application that handle specific situations. For example, the PasswordRule class 815 implements a rule related to controls displaying passwords. The VisibilityRule class 820 is another example. The specific rules are then registered in the framework 310 (via MessageSecurityFramework class 800) along with a control id that uniquely identifies the control to be protected. The framework class 800 then ensures that messages to this control are intercepted and that the necessary callback functions on the MessageSecurityRule 810 are called.

As an example, the PasswordRule 815 is concerned with ensuring that data shown in the control as a password is not shown in clear text, which is possible by sending specific messages to the control. So if the application, upon displaying the control containing a password, registers the PasswordRule on the control, subsequent messages sent to the control that try to remove the password protection of the data will cause the framework to invoke the callback functions on the MessageSecurityRule 810, which in this case are implemented by PasswordRule 815. These specific implementations would then ensure that the control is indeed still displaying a password, and if so, instruct the framework 310 to ignore the message, i.e., prevent it from taking effect.

In one example embodiment, when the application is up and running, the bulk of the work in the framework 310 is happening in a function implemented by MessageSecurityFramework class 800. In this example, the function is illustrated in FIG. 9. It is called whenever a message is intercepted.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of providing security for an application running on a messaging based operating system, the method comprising:

receiving an indication from the application indicative of one or more types of messages which are considered to be potential security threats to the application and registering the one or more types of messages as potential security threats by storing data indicative of the one or more types of messages in a database;

after registering the one or more types of messages as potential security threats, obtaining a first message from a message queue for the application;

determining whether the first message is of a type registered by the application as being a potential security threat based on the data indicative of the one or more types of messages; and processing the first message, using a processor of a computer by:

performing a callback to a callback function of the application if it was determined that the first message is of a type requested by the application as a potential security threat;

receiving a return value from the callback function of the application;

determining whether to prevent the first message based upon the return value from the callback function of the application;

preventing the first message and causing the next message in the message queue to be obtained if it is determined to prevent the first message based upon the return value; and calling the application process for handling the first message if it is determined not to prevent the first message based upon the return value.

2. The computer-implemented method of claim 1, wherein processing the first message comprises calling an application process for handling the first message if it was determined that the first message is not of a type registered by the application as being a potential security threat.

3. The computer-implemented method of claim 1, wherein processing the first message comprises:

determining whether to perform the callback to the callback function of the application if it was determined that the first message is of a type registered by the application as a potential security threat; and preventing the first message and causing a next message in the message queue to be obtained if it is determined not to perform a callback to the callback function of the application.

4. The computer-implemented method of claim 1, wherein obtaining the first message from the message queue for the application further comprises obtaining the first message from the message queue for the application managed by an operating system on which the application runs.

5. The computer-implemented method of claim 4, wherein obtaining the first message from the message queue further comprises intercepting the first message using a message security framework.

6. The computer-implemented method of claim 5, wherein intercepting the first message using the message security framework further comprises intercepting the first message using the message security framework which also runs on the operating system on a same computer as the application.

7. The computer-implemented method of claim 5, wherein intercepting the first message using the message security framework further comprises intercepting the first message using the message security framework which at least partially resides on a second computer connected to the first computer over a computer network.

8. A security framework apparatus configured to implement the method of claim 1.

9. A computer-readable storage device having computer-executable instructions for performing the method of claim 1.

10. A computer-implemented security framework for providing message security for application programs running on a messaging based operating system, the security framework comprising:

a message registration component used by a plurality of application programs to register message types which are potential security threats, the message registration component receiving indications from the plurality of application programs indicative of types of messages which are considered to be potential security threats, wherein, for each respective application program of the plurality of application programs, the message registration component maintains data indicating message types which are potential security threats associated with the respective application program;

a message intercepting component which obtains a first message taken from a message queue for a first application of the plurality of application programs;

a message security component that receives the first message from the message intercepting component and performs message handling security steps on the first message, using a processor of a computer, to prevent attacks on the first application, wherein the message security component performs the message handling security steps on the first message based upon whether a type of the first message was registered in the message registration component by the first application program as a potential security threat wherein the message security component determines whether to perform a callback to a callback function of the first application if it was determined that the first message is of a type registered by the first application as a potential security threat, and if it is determined to not perform the callback then the message security component preventing the first message and causing a next message in the message queue to be obtained, and if it is determined to perform the callback then the message security component performing the callback to the callback function of the first application and determining whether to prevent the first message based upon a return value received from the callback function; and wherein the message security component of the security framework is outside and separate from the first application such that the message security component performs the message handling security steps for each of the plurality of application programs based on whether message types were registered by the application programs as potential security threats.

11. The security framework of claim 10, and further comprising a message registration component used by application programs to register message types which are potential security threats, and wherein the message security component is configured to perform the message handling security steps on the first message based upon whether a type of the first message was registered by the first application program as a potential security threat.

12. The security framework of claim 11, wherein the message security component is configured to either call a process of the first application for handling the first message if the first message is not of a type registered by the first application as being a potential security threat, or to pass control back to an operating system messaging component in order to call the process of the first application if the message is not of the type registered by the first application as being a potential security threat.

13. A computer-readable storage device having computer-executable instructions for implementing an application program for use with a messaging based operating system, comprising:

a message registration component that receives indicators indicative of types of messages which are considered to be potential security threats and that registers data indicating the message types which are potential security threats;

wherein the application program comprises:

an application message loop of the application program that retrieves messages from a message queue for the application program that is managed by the operating system, wherein the application message loop dispatches the retrieved messages to a message security framework which implements message security steps to prevent attacks on the application program; and a callback function of the application program that receives a callback from the message security framework when a message dispatched to the message security framework has been registered with the message registration component as being a potential security threat to the application program, and wherein the callback function implements one or more message security rules for the application program and provides a return value to the message security framework, using a processor of a computer, the return value instructing the message security framework whether to prevent the message.

14. The computer-readable storage device of claim 13, wherein the application program further comprises an application process configured to handle messages returned to the application program from the message security framework.

15. The computer-readable storage device of claim 13, wherein at least one security rule implemented by the callback function is associated with a specific control within the application program using a control ID that uniquely identifies the specific control such that messages to the specific control are intercepted and handled according to the at least one security rule.

* * * * *